(12) United States Patent
Weitz et al.

(10) Patent No.: US 8,883,291 B2
(45) Date of Patent: Nov. 11, 2014

(54) METAL OXIDE COATING ON SURFACES (75) Inventors: David A. Weitz, Bolton, MA (US);
Christian Holtze, Medford, MA (US);
Adam R. Abate, Somerville, MA (US);
Daeyeon Lee, Somerville, MA (US);
Thao Do, Alexandria, VA (US)

(73) Assignee: President and Fellows of Harvard College, Cambridge, MA (US)

( * ) Notice: Subject to any disclaimer, the term of this patent is extended or adjusted under 35 U.S.C. 154(b) by 514 days.

(21) Appl. No.: 12/733,086

(22) PCT Filed: Aug. 7, 2008

(86) PCT No.: PCT/US2008/009477
§ 371 (c)(1),
(2), (4) Date: Jun. 3, 2010

(87) PCT Pub. No.: WO2009/020633
PCT Pub. Date: Feb. 12, 2009

(65) Prior Publication Data
US 2010/0239824 A1 Sep. 23, 2010

Related U.S. Application Data

(60) Provisional application No. 60/963,709, filed on Aug. 7, 2007.

(51) Int. Cl.
*B32B 3/20* (2006.01)
*B32B 3/30* (2006.01)
*B32B 3/00* (2006.01)
*C23C 18/12* (2006.01)
*C03C 1/00* (2006.01)

(52) U.S. Cl.
CPC ......... *C23C 18/1295* (2013.01); *C23C 18/1233* (2013.01); *C23C 18/1254* (2013.01); *C23C 18/1216* (2013.01); *C03C 1/008* (2013.01)

USPC ........................... 428/172; 428/167; 428/188

(58) Field of Classification Search
USPC ......... 428/166, 167, 188, 173, 457, 689, 702, 428/172
See application file for complete search history.

(56) References Cited

U.S. PATENT DOCUMENTS

| 5,512,131 A | 4/1996 | Kumar et al. |
| 5,948,484 A | 9/1999 | Gudimenko et al. |

(Continued)

FOREIGN PATENT DOCUMENTS

| EP | 1164207 A2 | 12/2001 |
| JP | 2003-136500 | 5/2003 |

(Continued)

OTHER PUBLICATIONS

International Search Report from PCT/US2009/000850, mailed May 29, 2009.

(Continued)

*Primary Examiner* — Catherine A Simone
(74) *Attorney, Agent, or Firm* — Wolf, Greenfield & Sacks, P.C.

(57) ABSTRACT

The present invention provides a method for coating metal oxide on a PDMS surface. The method includes preparing a mixture that contains a sol-gel precursor, reacting the mixture to form a preconverted sol-gel precursor, where the preconverted sol-gel precursor does not diffuse into PDMS and is not in the form of a gel, forming a reactive PDMS surface, applying the preconverted sol-gel precursor onto the reactive PDMS surface, binding the preconverted sol-gel precursor to the re-active PDMS surface, and converting the bound preconverted sol-gel precursor to a metal oxide to form a metal oxide coating on the PDMS surface. The present invention also provides a PDMS microfluidic device where one or more channels of the microfluidic device is provided with a metal oxide coating covalently bound only on the surface of the one or more channels.

11 Claims, 7 Drawing Sheets

(56) References Cited

U.S. PATENT DOCUMENTS

| | | | |
|---|---|---|---|
| 6,355,198 B1 | | 3/2002 | Kim et al. |
| 6,426,371 B1 | | 7/2002 | Li et al. |
| 6,576,478 B1 | * | 6/2003 | Wagner et al. ............ 506/32 |
| 7,431,889 B2 | * | 10/2008 | Engstrom et al. .......... 422/506 |
| 7,776,927 B2 | | 8/2010 | Chu et al. |
| 8,084,085 B2 | * | 12/2011 | Remy ..................... 427/235 |
| 2003/0104466 A1 | * | 6/2003 | Knapp et al. ............... 435/6 |
| 2004/0028566 A1 | | 2/2004 | Ko et al. |
| 2005/0127002 A1 | | 6/2005 | Zare et al. |
| 2005/0172476 A1 | | 8/2005 | Stone et al. |
| 2005/0233899 A1 | | 10/2005 | Anzaki et al. |
| 2006/0088666 A1 | | 4/2006 | Kobrin et al. |
| 2006/0163385 A1 | | 7/2006 | Link et al. |
| 2006/0166537 A1 | | 7/2006 | Thompson et al. |
| 2006/0171990 A1 | | 8/2006 | Asgari |
| 2007/0000342 A1 | | 1/2007 | Kazuno |
| 2007/0005024 A1 | | 1/2007 | Weber et al. |
| 2007/0054119 A1 | | 3/2007 | Garstecki et al. |
| 2007/0224082 A1 | | 9/2007 | Ogawa |
| 2009/0012187 A1 | | 1/2009 | Chu et al. |
| 2011/0123413 A1 | | 5/2011 | Abate et al. |

FOREIGN PATENT DOCUMENTS

| | | | |
|---|---|---|---|
| JP | 2003-230829 | | 8/2003 |
| JP | 2004-125475 | | 4/2005 |
| JP | 2005-103423 | | 4/2005 |
| JP | 2005-519264 | | 6/2005 |
| JP | 2005-331286 | | 12/2005 |
| JP | 2007-538226 | | 12/2007 |
| JP | 2008-530317 | | 8/2008 |
| JP | 2008-284626 | | 11/2008 |
| KR | 2006-0049351 | A | 5/2006 |
| WO | WO 96/29629 | A2 | 9/1996 |
| WO | WO 01/89787 | A2 | 11/2001 |
| WO | WO 03/072831 | | 9/2003 |
| WO | WO 03104774 | A1 * | 12/2003 |
| WO | WO 2004081536 | A2 * | 9/2004 |
| WO | WO 2005/001121 | | 1/2005 |
| WO | WO 2006/027757 | | 3/2006 |
| WO | WO 2006/086841 | | 8/2006 |
| WO | WO 2006/096571 | A2 | 9/2006 |
| WO | WO 2008/121342 | A2 | 10/2008 |
| WO | WO 2009/120254 | | 10/2009 |

OTHER PUBLICATIONS

Abate, A. et al., "Glass coating for PDMS microfluidic channels by sol-gel methods", *Lab on a Chip*, vol. 8, pp. 516-518 (2008).

Angell, J., et al., "Silicon Micromechanical Devices," *Scientific American*, vol. 248, pp. 44-55 (1983).

Duffy, D., et al., "Rapid Prototyping of Microfluidic Systems in Poly(dimethylsiloxane)", Anal. Chem., vol. 70, pp. 4974-4984 (1998).

Li, et al., "The Impact of Ultraviolet Light on Bacterial Adhesion to Glass and Metal Oxide-Coated Surface." *Colloids and Surfaces B: Biointerfaces*, 41, pp. 153-161 (2005).

Soppera, et al. "Optimization of Radical Photopolymerization in Hybrid Sol-Gel Glasses: Advantages of Biocomponent Photoactive Systems," *Mat Res Soc Symp Proc.*, vol. 726. (2002).

Wang, W. et al., "Modification of poly(dimethylsiloxane) microfluidic channels with silica nanoparticles based on layer-by-layer assembly technique," *Journal of Chromatography, A*, 1136 (1), pp. 111-117 (2006).

Yoshida, et al. "Preparation and Water Droplet Sliding Properties of Transparent Hydrophobic Polymer Coating by Molecular Design for Self-Organization." *Journal of Sol-Gel Science and Technology*, 31, pp. 195-199 (2004).

Arkles, B. et al. "Tailoring surfaces with silanes" Chemtech Dec. 1977, 766-778.

Fiorini, G. et al. "Fabrication of thermoset polyester microfluidic devices and embossing masters using rapid prototyped polydimethylsiloxane molds" Lab. Chip, 2003, 3, 158-163.

International Search Report and Written Opinion for PCT Application PCT/US2008/009477 dated Jun. 24, 2009.

Kelly, R. et al. "Thermal Bonding of Polymeric Capillary Electrophoresis Microdevices in Water" Anal. Chem. 2003, 75, 1941-1945.

Lee, D. et al. "All-Nanoparticle Thin-Film Coatings" Nano Letters 2006, vol. 6, No. 10, 2305-2312.

Roman, G. et al. "Sol-Gel Modified Poly0Dimethylsiloxane) Microfluidic Devices with High Electroosmotic Mobilities and Hydrophilic Channel Wall Characteristics" Anal. Chem. 2005, 77, 1414-1422.

Vickers, J. et al. "Generation of Hydrophilic Poly(dimethylsiloxane) for High-Performance Microchip Electrophoresis" Anal. Chem. 2006, 78, 7446-7452.

Parashar, V. et al. "The Sol-Gel Process for Realisation of Optical Micro-Structures in Glass" Key Engineering Materials vols. 264-268 (2004), pp. 371-374.

Roman, G. et al. "Surface Engineering of Poly(dimethylsiloxane) Microfluidic Devices Using Transition Metal Sol-Gel Chemistry" Langmuir 2006, 22, 4445-4451.

Xia, Y. et al. "Soft Lithography" Annu. Rev. Materi. Sci. 1998, 28: 153-84.

Sakai, Y. et al. "Silica coating on plastics by liquid phase deposition (LPD) method" Thin Solid Films 392 (2001) 294-298.

International Preliminary Report on Patentability for PCT/US2009/000850 mailed Oct. 7, 2010.

International Preliminary Report on Patentability for PCT/US2008/009477 mailed Feb. 18, 2010.

Lee et al., Synthetic control of molecular weight and microstructure of processible poly(methylsilsesquioxane)s for low-dielectric thin film applications. Polymer. Oct. 2001;42(21):9085-89.

Office Action for U.S. Appl. No. 12/935,203 mailed Mar. 4, 2013.

Japanese Office Action for Application No. JP 2011-501785 mailed Jun. 25, 2013.

Office Action for U.S. Appl. No. 12/935,203 mailed Sep. 13, 2013.

Japanese Office Action for Application No. JP 2011-501785 mailed Mar. 26, 2014.

Notice of Allowance for U.S. Appl. No. 12/935,203 mailed Mar. 26, 2014.

Notice of Allowance for U.S. Appl. No. 12/935,203 mailed Apr. 23, 2014.

\* cited by examiner

METAL OXIDE COATING ON SURFACES

RELATED APPLICATIONS

This application is a national stage filing under 35 U.S.C. § 371 of International Application Ser. No. PCT/US2008/009477, filed Aug. 7, 2008, entitled "Metal Oxide Coating on Surfaces," by Weitz, et al. which claims the benefit of U.S. Provisional Patent Application Ser. No. 60/963,709, filed Aug. 7, 2007, entitled "Metal Oxide Coating on Surfaces," by Weitz, et al., incorporated herein by reference.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present invention relates to methods and systems for forming coatings on a surface. More particularly, the present invention relates to methods and systems for forming metal oxide coatings on a surface.

BACKGROUND OF THE INVENTION

Soft lithography has emerged as an important technique for the preparation of patterned structures for a wide range of applications. Soft lithography involves forming a pattern on a substrate, applying an uncured resin over the patterned substrate, curing the resin, and removing the resin to obtain a pattern that is inverse to that on the substrate. One of the most widely utilized resin in soft lithography is polydimethylsiloxane (PDMS), due to its low cost and robust/versatile material characteristics.

However, PDMS has two main drawbacks that limit its use in certain applications. First, PDMS is easily swelled by many organic small molecules, such as an organic solvent. Hence, it is not well-suited for many applications that involve organic chemistry.

Second, a functionalized PDMS surface loses its functional groups over time. Without wishing to be bound by theory, the loss of reactive groups on the surface is thought to be due to (a) the internalization of the reactive groups into the bulk of the PDMS and (b) the migration of PDMS molecules from the bulk of PDMS to the surface to cover the functionalized surface. Hence, reaction is possible only within a short time after the surface treatment.

Many previous attempts in rendering PDMS surface have been unsatisfactory. For example, Roman et al., "Sol-Gel Modified Poly(dimethylsiloxane) Microfluidic Devices with High Electroosmotic Mobilities and Hydrophilic Channel Wall Characteristics," Anal. Chem. (2005), Vol. 77, pp. 1414-1422 reports diffusion of metal oxide precursors throughout the bulk of the PDMS followed by a subsequent conversion to form metal oxides throughout the bulk of the PDMS. Roman and Culbertson, "Surface Engineering of Poly(dimethylsiloxane) Microfluidic Devices Using Transition Metal Sol-Gel Chemistry," Langmuir, (2006), Vol. 22, pp. 4445-4451 also reported functionalization of microchannels on PDMS surfaces, flowing metal oxide precursors into the microchannels, followed by subsequent conversion to metal oxides. However, both of these techniques suffer from the problem that diffusion of the precursors into the PDMS causes significant swelling and potential deformation/warping of the patterned features present on the PDMS. Moreover, an interpenetrating network of PDMS and metal oxide is formed instead of the desired coating of metal oxide on the surface of the PDMS.

The above-identified problems are overcome herein and the patent application provides a coating on the PDMS surface that is resistant to organic solvents. The coating can be further treated to provide reactive groups that are stable for a prolonged period of time without significant deformation of the PDMS.

SUMMARY OF THE INVENTION

In accordance with certain embodiments of the present invention, a method for coating metal oxide on a surface is provided. The method includes preparing a mixture that contains a sol-gel precursor to a metal oxide, reacting the mixture to form a preconverted sol-gel precursor, where the preconverted sol-gel precursor is of a form and/or molecular weight so that it does not diffuse into PDMS, applying the preconverted sol-gel precursor onto a reactive surface, binding the preconverted sol-gel precursor to the reactive surface, and converting the bound preconverted sol-gel precursor to a metal oxide to form a metal oxide coating on the surface. In certain embodiments, the surface may be a polydimethylsiloxane (PDMS) surface.

In accordance with some other embodiments of the present invention, a microfluidic device is provided. The microfluidic device includes one or more channels that are provided with a metal oxide coating covalently bound only on the surface of the one or more channels.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

The above and other objects and advantages of the present application will be apparent upon consideration of the following detailed description, taken in conjunction with the accompanying drawings, in which like reference characters refer to like parts throughout. The figures are schematic and are not intended to be drawn to scale. For purposes of clarity, not every component is labeled in every figure, nor is every component of each embodiment of the invention shown where illustration is not necessary to allow those of ordinary skill in the art to understand the invention. In the figures.

DETAILED DESCRIPTION OF THE INVENTION

In certain embodiments, methods and systems for coating PDMS surfaces are provided. In some instances, methods and systems for coating surfaces comprising hydroxyl groups (e.g., functionalized PDMS surfaces, functionalized glass surfaces, etc.) are provided. In some embodiments, methods and systems for coating PDMS surfaces with metal oxides using a sol-gel chemistry are provided. In yet some other embodiments, methods and systems for coating PDMS surfaces with a non-porous layer of metal oxide are provided.

Methods in accordance with certain embodiments include: (i) preparing a mixture comprising a sol-gel precursor to a metal oxide, a reaction catalyst, and a reaction inhibitor; (ii) reacting the mixture to form a preconverted sol-gel precursor, wherein the preconverted sol-gel precursor is of a form and/or molecular weight so that it does not diffuse into PDMS and is not in the form of a gel; (iii) forming a reactive PDMS surface; (iv) applying the preconverted sol-gel precursor onto the reactive PDMS surface; (v) binding the preconverted sol-gel precursor to the reactive PDMS surface; (vi) removing any unbound material; and (vii) converting the bound preconverted sol-gel precursor to a metal oxide to form a metal oxide coating on the PDMS surface.

In certain embodiments, the metal oxide coating may be a non-porous coating that is resistant to organic molecules. In some other embodiments, the metal oxide coating may be readily treated to form reactive groups on the surface of the metal oxide.

The invention is described herein primarily in the context of coatings on surfaces, coatings and methods that mitigate swelling of the underlying material, coating localized portions of surfaces, controlling hydrophobicity, etc. It is to be understood that any of the various aspects and options of the invention can be present, absent, and/or used alone or in combination with any other aspect, option, example, or embodiment.

Definitions

As used herein, the terms "preconverted precursors" or "preconverted sol-gel precursors" are meant to denote sol-gel precursors that have been reacted for a sufficient time so that they do not diffuse into the PDMS but may or may not have yet fully formed into a gel.

As used herein, the terms "reacted precursors" or "reacted sol-gel precursors" are meant to denote sol-gel precursors that have been reacted to form a gel but may or may not have yet fully formed into a metal oxide.

As used herein, any portion of PDMS that forms an interface with another material (e.g., air, liquid, etc.) will be referred to as a "PDMS surface."

It should be noted that the present application is generally applicable to any surfaces having hydroxyl groups thereon and is not limited solely to PDMS surfaces. For example, in some embodiments, the surface may comprise a metal oxide, glass, a polymer, etc.

In some aspects of the invention, a microfluidic channel may be coated in a sol-gel material. "Microfluidic," as used herein, refers to a device, apparatus, or system including at least one fluid channel having a cross-sectional dimension of less than about 1 millimeter (mm), and in some cases, a ratio of length to largest cross-sectional dimension of at least 3:1.

A "channel," as used herein, means a feature on or in an article (substrate) that at least partially directs flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and/or outlet(s). A channel may also have an aspect ratio (length to average cross sectional dimension) of at least 2:1, more typically at least 3:1, 5:1, 10:1, 15:1, 20:1, or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus).

The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, positioned to intersect with each other, etc.

The following applications are each incorporated herein by reference: U.S. patent application Ser. No. 08/131,841, filed Oct. 4, 1993, entitled "Formation of Microstamped Patterns on Surfaces and Derivative Articles," by Kumar, et al., now U.S. Pat. No. 5,512,131, issued Apr. 30, 1996; U.S. patent application Ser. No. 09/004,583, filed Jan. 8, 1998, entitled "Method of Forming Articles including Waveguides via Capillary Micromolding and Microtransfer Molding," by Kim, et al., now U.S. Pat. No. 6,355,198, issued Mar. 12, 2002; International Patent Application No. PCT/US96/03073, filed Mar. 1, 1996, entitled "Microcontact Printing on Surfaces and Derivative Articles," by Whitesides, et al., published as WO 96/29629 on Jun. 26, 1996; International Patent Application No.: PCT/US01/16973, filed May 25, 2001, entitled "Microfluidic Systems including Three-Dimensionally Arrayed Channel Networks," by Anderson, et al., published as WO 01/89787 on Nov. 29, 2001; U.S. patent application Ser. No. 11/246,911, filed Oct. 7, 2005, entitled "Formation and Control of Fluidic Species," by Link, et al., published as U.S. Patent Application Publication No. 2006/0163385 on Jul. 27, 2006; U.S. patent application Ser. No. 11/024,228, filed Dec. 28, 2004, entitled "Method and Apparatus for Fluid Dispersion," by Stone, et al., published as U.S. Patent Application Publication No. 2005/0172476 on Aug. 11, 2005; International Patent Application No. PCT/US2006/007772, filed Mar. 3, 2006, entitled "Method and Apparatus for Forming Multiple Emulsions," by Weitz, et al., published as WO 2006/096571 on Sep. 14, 2006; U.S. patent application Ser. No. 11/360,845, filed Feb. 23, 2006, entitled "Electronic Control of Fluidic Species," by Link, et al., published as U.S. Patent Application Publication No. 2007/000342 on Jan. 4, 2007; and U.S. patent application Ser. No. 11/368,263, filed Mar. 3, 2006, entitled "Systems and Methods of Forming Particles," by Garstecki, et al. Also incorporated herein by reference are U.S. Provisional Patent Application Ser. No. 60/920,574, filed Mar. 28, 2007, entitled "Multiple Emulsions and Techniques for Formation," by Chu, et al.; U.S. patent application Ser. No. 12/058,628, filed on Mach 28, 2008, entitled "Emulsions and Techniques for Formation," by Chu, et al.; PCT Patent Application No. PCT/US2008/004097, filed on Mar. 28, 2008, entitled "Emulsions and Techniques for Formation," by Chu, et al.; and U.S. Provisional Patent Application Serial No. 60/963,709, filed Aug. 7, 2007, entitled "Metal Oxide Coating on Surfaces," by Weitz, et al.

Sol-Gel Precursors

Sol-gel precursors that may be utilized include, but are not limited to, molecules that contain on average two or more hydrolysable moieties that can form metal oxides upon hydrolysis. Some examples include alkoxides, acetates, alkanoates, nitrates, halides, and the like of metals or metalloids. Some suitable metals or metalloids include aluminum, antimony, barium, bismuth, cadmium, calcium, cerium, cesium, chromium, cobalt, copper, dysprosium, erbium, gadolinium, germanium, hafnium, holmium, indium, iridium, iron, lanthanum, lead, lithium, lutetium, magnesium, manganese, molybdenum, neodymium, nickel, niobium, palladium, potassium, praseodymium, rhodium, rubidium, ruthenium, samarium, scandium, silicon, silver, sodium, strontium, tantalum, terbium, thallium, tin, titanium, tungsten, vanadium, ytterbium, yttrium, zirconium, and the like.

Some particular example of suitable sol-gel precursors can include ethyoxysilane, methoxysilane, titanium isopropoxide, vanadium butoxide, hexafluorosilicic acid, methyltrichlorosilane, and the like. Other examples include silsesquioxanes, such as alkyltrialkoxysilanes. In certain embodiments, the sol-gel precursor can be or comprise tetraethyl orthosilicate (TEOS), methyltriethoxysilane (MTES), or mixtures thereof.

Pre-Converted Sol-Gel Precursor

Before applying the precursors to the PDMS surface, the sol-gel precursors can be further reacted to form preconverted precursors. Formation of the pre-converted sol-gel precursor has a number of benefits including, and not limited to, reducing diffusion of the sol-gel precursor into the PDMS, reducing swelling of the PDMS, and reducing distortion of the features that are present in or on the PDMS.

To form the preconverted precursors, a mixture containing the sol-gel precursor, reaction catalyst, reaction inhibitor, solvent, water, and/or the like can be formed and allowed to react. Some of the variables that can be controlled during the formation of the preconverted precursors include reactivity of the precursor (e.g., the type of precursor utilized), reaction temperature, reaction time, reaction catalysts, reaction inhibitors, relative concentration of the precursor, catalyst, inhibitors and/or solvent, and the like.

Some suitable temperatures to form preconverted precursors can include from about $-25°$ C. to about $100°$ C., such as $20$-$70°$ C., $20$-$60°$ C., $20$-$50°$ C., $20$-$40°$ C., and $20$-$30°$ C. In certain embodiments, preconverted precursors can be formed at about $100°$ C.

Some suitable times to form preconverted precursors can range from about 1 second to about several weeks. For example, a suitable range may be from about 1-10,000 seconds, 10-1,000 seconds, 50-500 seconds, and the like.

In certain embodiments, formation of the preconverted precursors can be carried out at multiple temperatures and at multiple times. For example, preconverted precursors can be formed by forming a miscible mixture of the reactants at elevated temperature, such as $100°$ C. for 10 seconds, and then at $65°$ C. for about 12 hours.

In other embodiments, pH of the mixture can be adjusted which can change the time and temperature of reaction. For example, formation of preconverted precursors using lower pH (e.g., pH of about 0.5) mixtures can be carried out at lower temperatures and/or shorter times while formation of preconverted precursors using higher pH (e.g., pH of about 2 to 4) can be carried out at higher temperatures and/or longer times. The modification of such reaction conditions will be readily apparent to one of ordinary skill in the art.

In certain embodiments, when molecules that contain on average two or more hydrolyzable moieties that can form metal oxides upon hydrolysis are utilized as the sol-gel precursor, a suitable amount water can be added to the mixture to form preconverted precursors.

In certain embodiments, catalysts can be added to the mixture to speed up the rate of reaction of the precursors to form preconverted precursors. Some suitable catalysts include acids, such as acetic acid, hydrochloric acid, nitric acid, sulfuric acid, oxalic acid, phosphoric acid, and the like.

In certain embodiments, reaction inhibitors can be added to the mixture to slow down the rate of reaction. Reaction inhibitors may be beneficial in slowing down the reaction kinetics to control the viscosity and delay the onset of gel formation. Some suitable inhibitors include alcohols, solvents that are miscible with water, or similar solvents. For example, methanol, ethanol, isopropanol, and the like can be utilized as suitable reaction inhibitors.

Some suitable range of relative molar concentrations of sol-gel precursor:catalyst:inhibitor range from about 5:1:1 to about 1:1:10. For example, 2:1:1 molar ratios of sol-gel precursor:catalyst:inhibitor can be utilized. Other variations, such as 1:1:1:1 molar ratios of a first sol-gel precursor:second sol-gel precursor:catalyst:inhibitor can be utilized.

Applicants have discovered that preconverted precursors can reduce diffusion of the precursors into the PDMS. Without wishing to be bound by theory, preconversion of the precursor may lead to at least one of two beneficial effects that reduce diffusion of the precursors into the PDMS.

First, increased molecular weight of the preconverted precursors can tend to decrease the entropy of mixing. Hence, preconverted precursors that have higher molecular weights than the monomeric form of precursors may lead to a lower tendency for the preconverted precursors to mix, and hence diffuse, into the PDMS bulk.

Second, the preconversion may lead to conversion of the precursors from a molecule having a hydrophobic character in the monomeric state to a molecule having a hydrophilic character in the preconverted precursor state. The conversion of the precursor from a hydrophobic character to a hydrophilic character may lead to an increase in the enthalpy of mixing. Hence, preconverted precursors with a hydrophilic character may lead to a lower desirability for the preconverted precursors to mix, and hence diffuse, into the hydrophobic PDMS.

In certain embodiments, the preconverted precursors can be reacted so that less than about 50%, 40%, 40%, 20%, 10%, 5%, or 1% swelling of the PDMS occurs.

In certain embodiments, the conversion to a preconverted sol-gel precursor can generally be carried out to a point before gel formation occurs, (or before the onset of the gel-point), which can be measured by a change of the reacting mixture from a viscous liquid to a solid gel where flow is significantly reduced. Gel formation can be also be viewed as the point at which the first network molecule is formed as reaction of the sol-gel precursors occur. In certain embodiments, the gel point can occur abruptly where a liquid rapidly (on the order of seconds and/or minutes) changes to a solid and does not flow.

Forming a Reactive PDMS Surface

PDMS surfaces can be prepared in any number of suitable methods. For example, a flat, curved, grooved, pitched, and any other types of surfaces can be formed. In some embodiments, one or more channels can be formed on a pre-existing PDMS surface or within the bulk of the PDMS, for example, by contacting a PDMS surface having one or more channels with a flat PDMS surface. Other suitable techniques for forming PDMS surfaces will be readily apparent to one of ordinary skill in the art.

Size of the PDMS surface and/or channels formed thereon and/or therein is not limited. Size of the PDMS surface and/or channels can be several nanometers in dimension to several meters. In certain embodiments, microchannels having dimensions that are about 1-1000 microns can be formed on or in the PDMS. In some other embodiments, nanochannels having dimensions that are about 10 to 1000 nanometer can be formed on or in the PDMS.

In certain embodiments, when one or more channels are formed, the size of the channels can be designed so that flow of material into each of the individual network channels can be achieved in equal or unequal amounts. For example, size of the channels can be designed so that the pressure drop that occurs during flow into multiple channels from a central inlet are substantially equal to lead to substantially flow of fluids in each of the multiple channels.

In accordance with certain embodiments, the PDMS surface can be treated to form reactive groups on the surface. The reactive groups can be reactive with or have a high affinity for the preconverted precursors to allow the preconverted precursor to form a link on the PDMS surface. A suitable link may be in the form of a covalent bond, an ionic bond, van der Waals interactions, charge interactions, and the like.

To form the reactive surfaces, the PDMS surface can be treated with a plasma, base, ultraviolet radiation, chemical oxidation, and the like. For example, a plasma using oxygen or air can be utilized to form reactive silanol groups on the PDMS surface. Other suitable techniques for forming reactive groups on a PDMS surface will be readily apparent to one of ordinary skill in the art.

In certain embodiments, PDMS surfaces can be selectively patterned or masked so that reactive groups are formed on only certain desired portions of the PDMS. For example, a flat PDMS surface may be provided with a line grating so that only exposed portions of the PDMS form reactive groups thereon. Accordingly, a topologically flat PDMS surface may have patterned regions reactive and unreactive portions.

Other suitable and desirable modifications will be readily apparent to one of ordinary skill in the art.

Application of Preconverted Precursor to the Reactive PDMS Surface

The preconverted precursor can be applied to at least a portion of the reactive PDMS surface. Any suitable technique for applying the preconverted precursor to the reactive PDMS surface can be utilized, such as solution casting, spin casting, capillary flow, and the like.

In certain embodiments, the preconverted precursor can be filtered prior to application onto the reactive PDMS surface to remove any undesired impurities, such as large particulate impurities.

In certain embodiments, application of the preconverted precursors can be determined by the extent of reaction of the preconverted precursors. Conditions in which the preconverted precursors can flow through the channels without clogging may be determined by the viscosity of the preconverted precursors and the pressure that can be applied within the channels. Accordingly, the dimensions of the channels, viscosity of the preconverted precursors, and the speed of application may be adjusted as needed.

In certain embodiments, when the preconverted precursor is applied to one or more channels in the PDMS, clogging of the channels can occur. Accordingly, providing a continuous flow of the preconverted precursors to the reactive PDMS surface may be beneficial. For example, a continuous flow of the preconverted precursors to the reactive PDMS surface may be accomplished by using, for example, a hand syringe, a syringe pump, and the like. Suitable rate of flow can be determined based on various experimental parameters, such as the concentration of preconverted precursor in the solution, temperature, desired coating thickness, and the like. Some suitable flow rates include 5 to 5000 microliters per hour for 10 seconds to a few days, depending on the desired conditions. For example, 500 microliters per hour for about 30 minutes may be utilized.

Moreover, when network of channels are formed, the relative size of the channels can be designed so that flow of material into the network channels can lead to equal or unequal distribution of the preconverted precursor in each channel. In some other embodiments, the equal of unequal distribution of the preconverted precursor in each channel can be effected by the flow rate of the preconverted precursor.

Binding of Preconverted Precursor and/or Reacted Precursor to the PDMS Surface

As described above, the preconverted precursor may bind, such as through a covalent bond, an ionic bond, van der Waals interactions, charge interactions, and the like, to the reactive surface of the PDMS. Parameters, such as time and/or temperature, may be changed to affect the rate of binding. For example, binding may be carried out in room temperature or at elevated temperatures.

Binding of the preconverted precursor may be accompanied by the formation of reacted precursor, which may also bind to the reactive PDMS surface. Moreover, additional preconverted precursor and/or reacted precursor may successively bind onto the preconverted precursor and/or reacted precursors previously bound to the reactive PDMS surface. Accordingly, the thickness of the preconverted precursor and/ or reactive precursor formed on the reactive PDMS surface may increase over time.

Removal of Unbound/Undeposited Material

In certain embodiments, after sufficient amount of the preconverted precursor or reacted precursor has been bound to the PDMS surface, any unbound material may be removed. Unbound material may include any material contained in the mixture, such as unbound preconverted precursor, reacted precursor, catalyst, inhibitor, solvent, and the like. Generally, any material that is immiscible with the gel or the precursor can be utilized to displace any unbound material. In certain embodiments, materials that wet the reactive PDMS less than the preconverted precursors can be utilized. In other embodiments, hydrophobic liquids and gases, such as noble gases, oxygen, hydrogen, carbon dioxide, mixtures thereof, and the like, can be utilized. In some other embodiments, one or more inert fluids, such as an oil, solvent, silanes, and the like can be used to displace any unbound material. For example, FC3283 oil, ethanol, HFE7100, and the like can be utilized as inert fluids. Such inert fluids may be provided as a mixture or in successive combination. For example, oil and air may be utilized to displace the unbound material. Alternatively, flow of air may be followed by oil.

In certain embodiments, gel formation throughout the entire channel can be avoided by carrying out the removal of unbound/undeposited material at a suitable time. For example, removal of the unbound/undeposited material can be carried out after about 1, 2, 3, 5, 10, 20, 30, 100, 1000, 1000, 10,000 seconds (and the like) after binding of the preconverted precursor to the PDMS channel has started.

However, it should further be noted that removal of unbound material may be optional. For example, when all of the preconverted precursor has been bound onto the PDMS surface (e.g., by using a low concentration of the preconverted precursor mixture), removal of unbound material may not be needed.

Conversion of Bound Preconverted Precursor and/or Reacted Precursor to Metal Oxide Coating Upon deposition of the desired thickness of the preconverted precursor and/or reacted precursor, the preconverted precursor and/or reacted precursor can be allowed to form the desired metal oxide film, such as a silica coating. For example, the coated PDMS surfaces can be allowed to react for additional time (e.g., overnight) for the reaction to go to completion to form a metal oxide coating. Additional parameters, such as temperature, pressure, and the like, can be altered to control the reaction. The metal oxide and/or sol-gel precursor coating can be of any desired thickness. For instance, the coating may have a thickness of no more than about 100 micrometers, no more than about 30 micrometers, no more than about 10 micrometers, no more than about 3 micrometers, or no more than about 1 micrometer. In some cases, the coating may have a thickness of at least 0.1 micrometers, at least 1 micrometer, at least 10 micrometers, at least 30 micrometers, or at least 100 micrometers. Thicker coatings may be desirable in some cases, for instance, in applications in which higher chemical resistance is desired. However, thinner coatings may be desirable in other applications, for instance, within relatively small microfluidic channels.

Modification of Metal Oxide Coating

It should be noted that in certain embodiments, after the formation of a metal oxide coating, further modification to the metal oxide coating can be carried out. For example, the metal oxide coating can be rendered reactive and the above-described techniques for deposition metal oxide may be repeated as desired, as would be readily apparent to one of ordinary skill in the art. In the case when silica is coated, numerous techniques, such as HCl treatment, mild HF treatment, hydrogen peroxide treatment, piranha treatment, silane based chemistry, polymer adsorption, polymer grafting, and the like will be readily apparent to one of ordinary skill in the art to form silanol groups on the silica surface. Upon formation of the metal oxide-OH groups, additional silica sol-gel precursors, either in monomeric or preconverted precursor form, can be applied to form thicker coatings.

Additional modifications can include deposition of other coatings that have desired properties, such as superhydrophilic and/or superhydrophobic properties. For example, as described above, when silica is formed as the coating, reactive silanol groups can be formed on the silica surface. Desired materials, such as silica nanoparticles, can be applied to form superhydrophilic surfaces. Alternatively, materials such as perfulorosilanes, perfluorinated silanes, alkyl silanes (e.g., octadecyltrichlorosilanes), and the like can be applied to form superhydrophobic surfaces.

Resulting Device

The present invention provides a PDMS surface where a metal oxide coating is bound on the surface of the PDMS without any significant diffusion of the metal oxide precursors into the bulk of the PDMS. In particular, the present invention provides a microfluidic device having one or more channels, where metal oxide coating is bound on the channel walls of the microfluidic device. In certain embodiments, the metal oxide coating is covalently bound to the PDMS surface or the channel walls of the microfluidic device.

Applications

The present invention can be utilized in a wide range of applications. For example, formation of a metal oxide coating on PDMS surface can provide the ability to use organic solvents, ability to control adsorption of certain compounds, ability to control wetting and flow behavior in microfluidic channels, and the like.

Some exemplary applications involving microfluidics using organics solvents include chemical synthesis in confined dimensions, screening of organic chemical reactions that occur in one-phase Poiseuille flow and/or in heterophase flow (e.g., flows containing bubbles and/or droplets), and the like.

In certain embodiments, polymers or other molecules can be grafted onto the coated PDMS surfaces. For example, biological molecules, such as amino acids and/or proteins can be grafted onto the surface in a spatially defined pattern to carry out numerous sensing applications.

In some other embodiments, the porosity of the coatings can be controlled during the formation of the coatings. Without wishing to be bound by theory, it is generally thought that lower pH mixtures can lead to formation of more porous coatings. Hence, coatings made from mixtures having higher pH values can lead to increased interfacial surface area where functional groups are present. In other words, the density per unit channel length of functional groups that are available on the coating surface can increase. This means that if used as a sensor by grafting on desired molecules, the sensitivity of the sensors can be tuned.

Figure 5A:
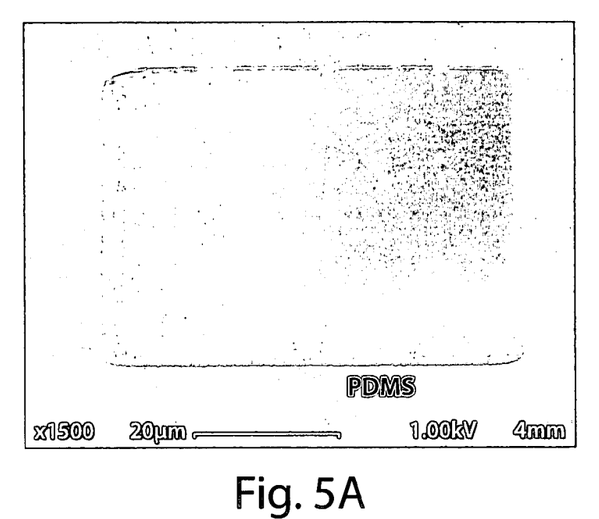
FIGS. 5A and 5B respectively show scanning electron microscope (SEM) images of an uncoated PDMS microchannel and the PDMS microchannel coated with a metal oxide in accordance with certain embodiments of the present invention.
Figure 5B:
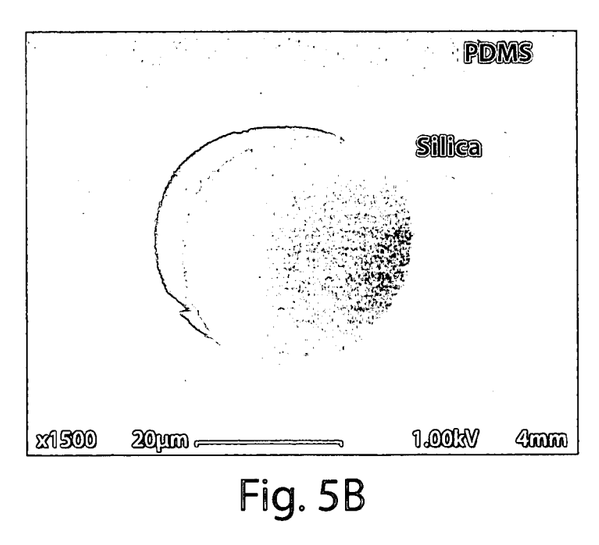
Figure 6A:
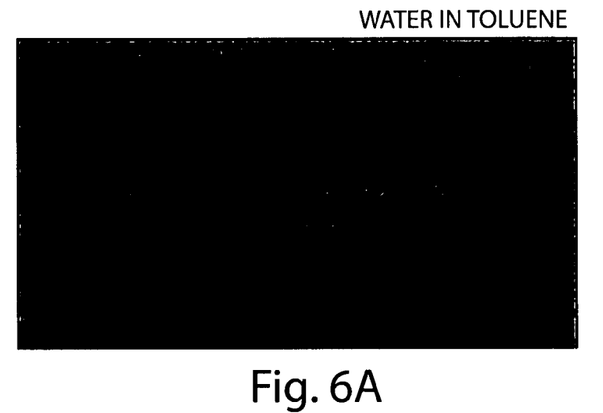
FIGS. 6A and 6B respectively show images of PDMS microchannels coated with a metal oxide where formation of water droplets in toluene and toluene droplets in water, respectively, can be obtained in accordance with certain embodiments of the present invention.
Figure 6B:
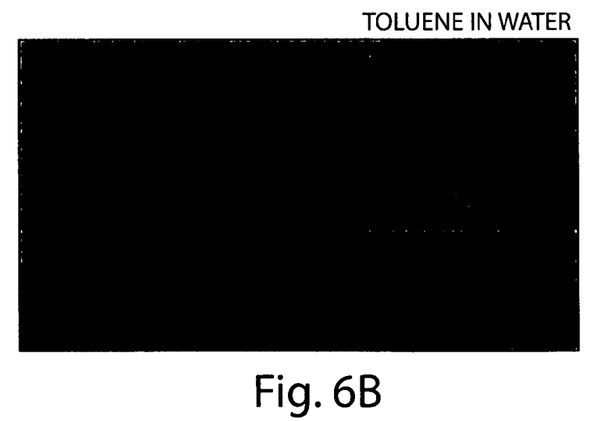

Furthermore, as shown in FIG. 5B, certain embodiments can provide cylindrical channels although the coating is deposited on a square PDMS channel. Such cylindrical channels may have additional advantages of simplifying flow profiles, which can in turn facilitate modeling, lead to more accurate prediction of flow properties, and reduced complicated hydrodynamic effects from interfering with flow. For example, monodisperse emulsions such as shown in FIGS. 6A and 6B (albeit with different materials) can be obtained, which in turn can be utilized to make monodisperse particles.

Figure 7:
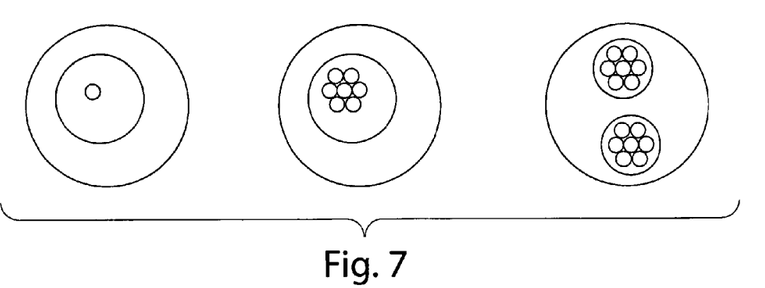
FIG. 7 shows some exemplary double-emulsion and multiple-emulsion schematics that may be formed using the systems described herein in accordance with certain embodiments of the present invention.

Similarly, the coatings can be functionalized in a spatially defined manner to improve or decrease wettability in desired places, which in turn can allow the formation of double-emulsions or multiple emulsions with organic solvents, as shown in FIG. 7. Such structures may allow the formation of biologically relevant structures, such as lipid vesicles and membranes. In one set of embodiments, the hydrophobicity of the coating can be controlled, for instance, such that a first portion of the coating is relatively hydrophobic, and a second portion of the coating is more or less relatively hydrophobic than the first portion. The hydrophobicity of the coating can be determined using techniques known to those of ordinary skill in the art, for example, using contact angle measurements such as those discussed below. For instance, in some cases, a first portion of a substrate (e.g., within a microfluidic channel) may have a hydrophobicity that favors an organic solvent to water, while a second portion may have a hydrophobicity that favors water to the organic solvent.

Some other exemplary applications include controlling the adsorption properties of certain compounds.

Yet some other exemplary applications include controlling the wetting and flow behavior of fluids in microfluidic channels. For example, capillary electrophoresis can be carried out with the systems described herein.

EXAMPLE

Example 1

Coating of a Non-Porous Silica Layer

Tetraethyl orthosilicate (TEOS) was utilized as a suitable sol-gel precursor. Preconverted precursors was formed by mixing the TEOS with an acid catalyst and a reaction inhibitor. The acid catalyst was dilute hydrochloric acid (HCl), which was obtained by forming a 1:1000 mixture by volume of 38% HCl with water to obtain a pH of about 2. The reaction inhibitor was ethanol (EtOH). A 2:1:1 ratio (by volume) of TEOS:HCl:EtOH was mixed and allowed to react at room temperature for about 24 hours to form the preconverted precursors. At room temperature, onset of gel formation appears to occur approximately about 7 days after the mixture was first mixed.

Channels, having at least 15 µm height and width was formed by soft lithography. The channels were all connected to a central fluid inlet port and a central fluid output port where fluids can be injected into and out of the channels, respectively. The exposed PDMS surfaces, including the walls of the PDMS channels, were rendered reactive by oxygen plasma treatment for about 5 minutes. A flat slab of PDMS was also rendered reactive by oxygen plasma treatment for about 5 minutes. Subsequently, the two PDMS pieces were joined together at the reactive surfaces to form channels having a rectangular cross-section (at least 15×15 µm), where the four channel walls have reactive PDMS surfaces.

A syringe was connected with a tube that can fit the central inlet port of the PDMS (e.g., a polyethylene tube having 1.09 mm outer diameter). The syringe was first filled with an inert fluid, such as fluorocarbon oil FC 3283 (e.g., more than 20 p. 1), then with an air bubble (e.g., about 1 µl), followed by the preconverted precursor mixture (e.g., about 20 µl). The preconverted precursor mixture was filtered with a glass filter (2.7 µm pore size) before being loaded into the syringe.

The tube was connected to the inlet port of the PDMS and the syringe was pumped using a syringe pump at 400 µl/h so that the preconverted precursor first flows into the channels, followed by the air bubble, and finally followed by the fluorocarbon oil. The channels were filled with oil and was allowed to react for about 30 minutes whereupon the remaining fluorocarbon oil was removed using air. Additional reaction time, before or after removal of the oil, may be provided. The resulting structure is a silica coating on the PDMS channel walls.

Example 2

Comparative Data

A 3:2:1 ratio (by volume) of TEOS:HCl:EtOH was mixed and allowed to react at room temperature for about 24 hours to form the preconverted precursors.

Channels, about 50 µm in height and width, were formed by soft lithography. The channels were connected to a central fluid inlet port and a central fluid output port. Subsequently, the exposed PDMS surfaces, including the walls of the PDMS channels, were oxygen plasma treatment for about 5 minutes and bonded to a glass slide to form channels having a rectangular cross-section (at least 50×50 µm), where three channel walls have reactive PDMS surfaces.

A syringe was connected with a tube that can fit the central inlet port of the PDMS. The preconverted precursor mixture was filtered with a glass filter and loaded into the syringe. The tube was then connected to the inlet port of the PDMS and syringe was pumped using a syringe pump at about 500 µl/h for 10 minutes. Then the channels were cleared by using air.

The resulting structure is a silica coating on the PDMS channel that is impermeable to organic molecules. To test the silica coating's ability to form a barrier to organic molecules, the channels were filled with a 50 µM Rhodamine B water solution. The same Rhodamine B solution was also filled in an uncoated PDMS channel. Both channels were allowed to dry out at room temperature for about 4 days.

Figure 1A:
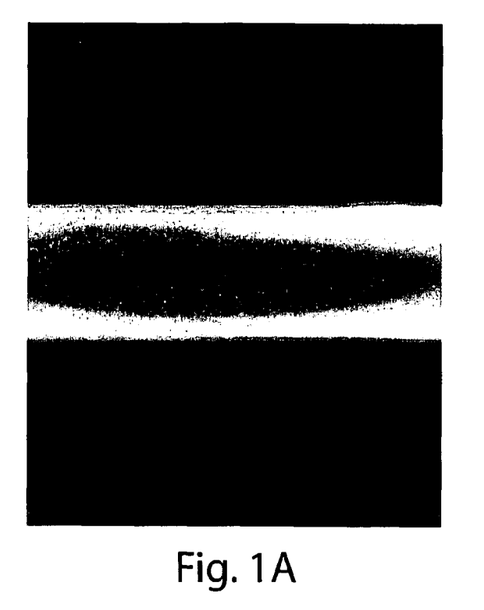
FIG. 1A is a confocal microscope image showing little or no diffusion of a fluorescent organic molecule into the PDMS when the PDMS is coated with a metal oxide coating in accordance with certain embodiments of the present invention.
Figure 1B:
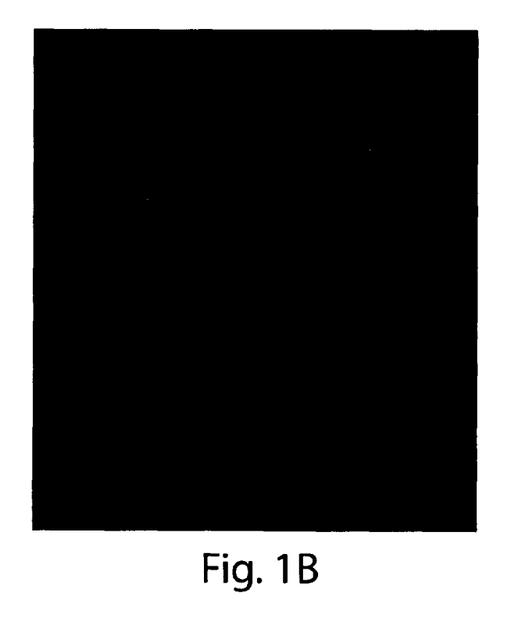
FIG. 1B is a confocal microscope image showing significant diffusion of a fluorescent organic molecule into the PDMS when the PDMS is not coated with a metal oxide.

FIGS. 1A and 1B show confocal microscope images of the silica coated PDMS channel (FIG. 1A) and an uncoated PDMS channel (FIG. 1B). The bright (i.e., fluorescing) portions correspond to the areas where the Rhodamine B is present. As shown, FIG. 1A shows no noticeable diffusion of the Rhodamine B into the PDMS bulk while FIG. 1B shows almost a complete diffusion of the Rhodamine B into the PDMS bulk.

Figure 2A:
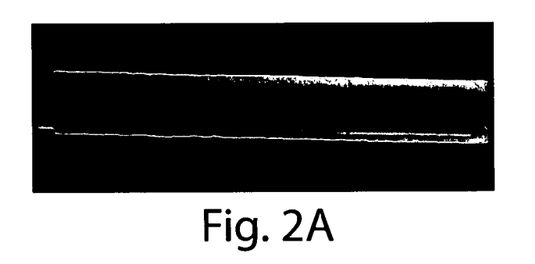
FIGS. 2A-2C show three different 3D views a PDMS channel coated with metal oxide coating that is obtained by reconstructing various confocal microscope images in accordance with certain embodiments of the present invention.
Figure 2B:
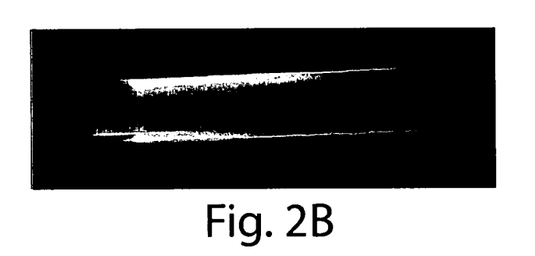
Figure 2C:
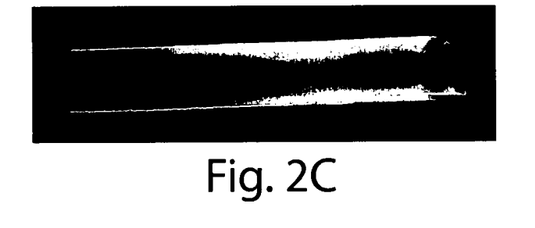

FIGS. 2A-2C show several different 3D views of Rhodamine B dried on the silica coating walls (bottom of the channel corresponding to the glass slide was not imaged). The 3D views were obtained by reconstructing various different confocal microscope images, as would be readily apparent to one of ordinary skill in the art. As shown, silica is uniformly coated throughout the three PDMS channel walls.

Example 3

Resistance to Organic Solvents

To demonstrate the silica coating's resistance to organic solvents, toluene was flowed through a PDMS channel coated with silica as described in Example 1 and a PDMS channel without any coating.

Figure 3A:
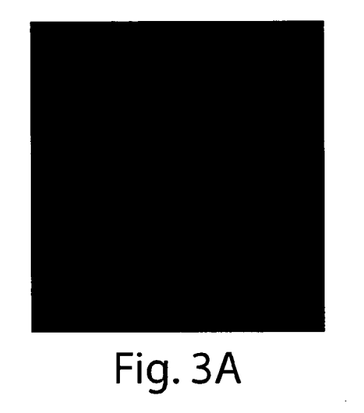
FIGS. 3A through 3C show time-lapsed images of a PDMS microchannel coated with a metal oxide in accordance with certain embodiments where toluene is flowed through the channel and does not lead to any noticeable deformation of the channel structure.
Figure 3B:
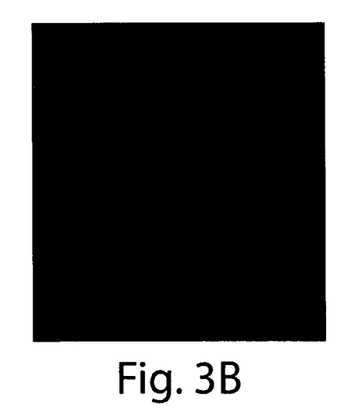
Figure 3C:
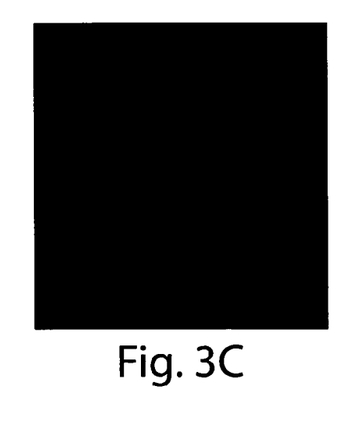

FIG. 3A shows an image of the PDMS channel coated with silica immediately after toluene was passed through. FIG. 3B shows an image of the PDMS channel coated with silica about 0.6 seconds after toluene was passed through. FIG. 3C shows an image of the PDMS channel coated with silica about 13 seconds after toluene was passed through.

Figure 4A:
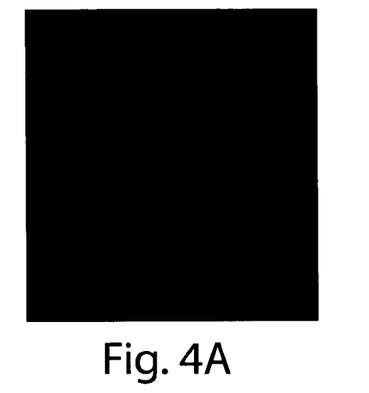
FIGS. 4A through 4C show time-lapsed images of an uncoated PDMS microchannel where toluene is flowed through the channel leading to significant distortion of the channel structure.
Figure 4B:
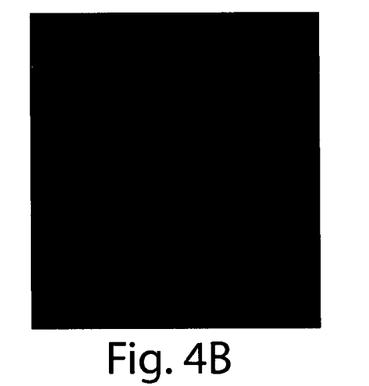
Figure 4C:
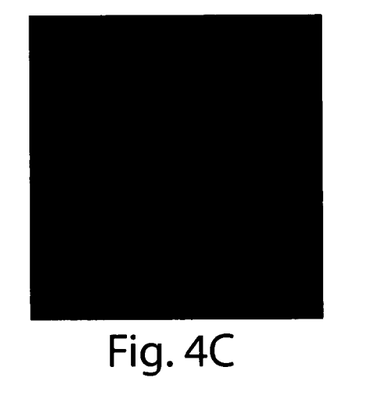

FIG. 4A shows an image of the PDMS channel without any coating immediately after toluene was passed through. FIG. 4B shows an image of the PDMS channel without any coating about 0.6 seconds after toluene was passed through. FIG. 4C shows an image of the PDMS channel without any coating about 13 seconds after toluene was passed through.

As shown in FIGS. 3A through 3C, there is no appreciable change in the channel. In contrast, as shown in FIGS. 4A through 4C, the PDMS channel is shown to begin swelling immediately after toluene passes through the channel and swells considerably after about 13 seconds.

Example 4

Coating of Non-Porous Silica Layer

A 1:1 mixture of tetraethyl orthosilicate (TEOS) and methyltriethoxysilane (MTES) was utilized as a suitable sol-gel precursor. The sol-gel precursor mixture was placed in a glass vial and ethanol and water (at pH of about 2.5 to about 4.5 using HCl) was added. The ethanol (EtOH) served as a reaction inhibitor. The molar ratio of TEOS:MTES:water:EtOH was about 1:1:1:1. The mixture was initially phase separated. The glass vial containing the mixture was placed in a microwave and irradiated for 3 seconds. Approximately 10-20 irradiation pulses formed miscible liquids. Thereafter, the mixed liquids were allowed to react at about 65° C. overnight to form the preconverted precursors. At room temperature, onset of gel formation appears to occur approximately about 7 to 10 days later.

Channels, having at least 40 µm height and 50 µm width was formed by soft lithography (see FIG. 5A). The channels were all connected to a central fluid inlet port and a central fluid output port where fluids can be injected into and out of the channels, respectively. The exposed PDMS surfaces, including the walls of the PDMS channels, were rendered reactive by oxygen plasma treatment for about 5 minutes. A flat slab of PDMS was also rendered reactive by oxygen plasma treatment for about 5 minutes. Subsequently, the two PDMS pieces were joined together at the reactive surfaces to form channels having a rectangular cross-section (at least 40×50 µm), where the four channel walls have reactive PDMS surfaces.

A syringe was connected with a tube that can fit the central inlet port of the PDMS (e.g., a polyethylene tube having 1.09 mm outer diameter). The syringe was filled with the preconverted precursor mixture (e.g., about 1 ml). The PDMS channel was filled with the preconverted precursor mixture by hand. Thereafter, the PDMS channel filled with the preconverted precursor mixture was placed on a 100° C. hotplate for about 10 seconds. Then, 10 mL of air was blown into the channel while still on the hotplate by applying a firm steady pressure while the coating solidifies. The resulting structure is a silica coating on the PDMS channel walls as shown in FIG. 5B.

Longer treatment times and/or higher temperature on the hotplate can lead to thicker silica coatings, which can be adjusted as desired. Such thicker silica coatings may promote further resistance to organic solvents that aggressively swell PDMS.

Example 5

Droplet Formation in Silica Coated Hydrophobic/Hydrophilic Channels

PDMS microchannels were coated with silica as described above in Example 4. Subsequently, the silica coated channels were rendered hydrophobic by applying it with AQUAPEL. Thereafter, as shown in FIG. 6A, a mixture of toluene and water was flowed into the channel to obtain water droplets in toluene (water-in-toluene emulsion).

Alternatively, the silica coated channels were rendered hydrophilic by treating with N-[3-trimethoxysilyl]propyl] ethylene diamine. As shown in FIG. 6B, a mixture of toluene and water was flowed into the channel toluene droplets in water (toluene-in-water emulsion).

Advantages of the Invention

Many advantages with the invention will be readily apparent to one of ordinary skill in the art.

First, binding of the preconverted precursor to the PDMS surface allows the formation of metal oxide coatings that are also bound on the PDMS surface. Such strong binding of the metal oxide on the PDMS surface minimizes removal or dewetting of the metal oxide from the PDMS surface during use.

Second, the metal oxide coating can be further treated to form reactive metal oxide surfaces. For example, a silicon oxide coating can natively have and/or can be further treated to form reactive silanol groups, much like the plasma treatment of PDMS can form reactive silanol groups on its surface. Accordingly, a wider range of silanols may be used for the post functionalization of the coated channels, as certain silanols that swells the PDMS, but not the coated channels, can now be utilized.

Third, unlike the reactive PDMS surface where diffusion of reactive groups into the PDMS or diffusion of non-reactive PDMS out from the PDMS leads to loss of reactive groups over time, metal oxide coatings having reactive groups do not suffer from such problems. Therefore, the present invention can form reactive surfaces that are stable over longer periods of time.

Fourth, any material that becomes reacted with the reactive metal oxide surface is further anchored to the PDMS through the bound metal oxide coating. Accordingly, the present invention provide binding materials of interest to the metal oxide surface providing a durable coating of the material of interest.

Fifth, the present invention overcomes the problem of diffusion of the precursors into the PDMS, which cause swelling of the PDMS. The present invention, however, provides a method for forming a metal oxide coating without significant deformation of the PDMS. Moreover, chemicals that would have otherwise diffused into the PDMS can now be fully confined within the channel, minimizing any potential loss of materials during transport through the channels.

Sixth, as the present invention utilizes preconverted precursors, shrinkage problems that may occur during conversion of the monomeric precursor into the metal oxide, after the monomer has diffused throughout the PDMS, is minimized. Correspondingly, as shrinkage is significantly reduced due to the use of preconverted precursors, this leads to the possibility of forming crack-free metal oxide coatings. The formation of crack-free metal oxide coatings on PDMS surfaces can provide greater chemical inertness, extending the applicability of PDMS to applications requiring the use of organic solvents.

Seventh, PDMS can facilitate the fabrication many identical copies of a device into a tiny space on a single chip. Such a technique can increase the production rate by many orders of magnitude by making it massively parallel. For example, if particles formation from droplet is desired, numerous channels can be made to scale up the fabrication of multiple droplets in a single device.

Lastly, the present invention provide versatile and easy to fabrication metal oxide coatings on any type of surfaces of PDMS. For example, machining or wet etching channels of glass is not only expensive and time consuming, but also has certain limitations in the sizes that can be made due to machining limitations. The present invention, however, is applicable in a wide range of sizes with more or less the same versatility and ease of fabrication.

Upon review of the description and embodiments of the present invention, those skilled in the art will understand that modifications and equivalent substitutions may be performed in carrying out the invention without departing from the essence of the invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. Thus, the invention is not meant to be limiting by the embodiments described explicitly above, and is limited only by the claims which follow. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A microfluidic device comprising:
    one or more channels defined by at least one surface; and
    a non-porous metal oxide coating covalently bound around the perimeter of the channel and only on the at least one surface that defines the one or more channels.

2. The microfluidic device of claim 1, wherein the metal oxide coating comprises an oxide of a metal selected from the group consisting of aluminum, antimony, barium, bismuth, cadmium, calcium, cerium, cesium, chromium, cobalt, copper, dysprosium, erbium, gadolinium, germanium, hafnium, holmium, indium, iridium, iron, lanthanum, lead, lithium, lutetium, magnesium, manganese, molybdenum, neodymium, nickel, niobium, palladium, potassium, praseodymium, rhodium, rubidium, ruthenium, samarium, scandium, silicon, silver, sodium, strontium, tantalum, terbium, thallium, tin, titanium, tungsten, vanadium, ytterbium, yttrium, and zirconium.

3. The microfluidic device of claim 1, wherein the channels are about 10 nm to about 1000 micrometers in size.

4. The microfluidic device of claim 1, wherein the metal oxide coating is substantially free of cracks.

5. The microfluidic device of claim 1, wherein the metal oxide comprises silica.

6. The microfluidic device of claim 1, wherein the surface comprises a PDMS surface.

7. A microfluidic device comprising:
one or more channels defined by at least one surface; and
a metal oxide coating covalently bound only on the at least one surface that defines the one or more channels, wherein at least part of the at least one surface on which the metal oxide coating is covalently bound comprises PDMS.

8. The microfluidic device of claim 7, wherein the metal oxide coating comprises an oxide of a metal selected from the group consisting of aluminum, antimony, barium, bismuth, cadmium, calcium, cerium, cesium, chromium, cobalt, copper, dysprosium, erbium, gadolinium, germanium, hafnium, holmium, indium, iridium, iron, lanthanum, lead, lithium, lutetium, magnesium, manganese, molybdenum, neodymium, nickel, niobium, palladium, potassium, praseodymium, rhodium, rubidium, ruthenium, samarium, scandium, silicon, silver, sodium, strontium, tantalum, terbium, thallium, tin, titanium, tungsten, vanadium, ytterbium, yttrium, and zirconium.

9. The microfluidic device of claim 7, wherein the channels are about 10 nm to about 1000 micrometers in size.

10. The microfluidic device of claim 7, wherein the metal oxide coating is substantially free of cracks.

11. The microfluidic device of claim 7, wherein the metal oxide comprises silica.

* * * * *